United States Patent
Bergqvist

(10) Patent No.: US 9,580,295 B2
(45) Date of Patent: Feb. 28, 2017

(54) SYSTEMS AND METHODS FOR FUEL DISPENSER SECURITY

(71) Applicant: Wayne Fueling Systems Sweden AB, Malmo (SE)

(72) Inventor: Anders Bergqvist, Kanor (SE)

(73) Assignee: Wayne Fueling Systems Sweden AB, Malmo (SE)

( * ) Notice: Subject to any disclaimer, the term of this patent is extended or adjusted under 35 U.S.C. 154(b) by 3 days.

(21) Appl. No.: 14/832,361

(22) Filed: Aug. 21, 2015

(65) Prior Publication Data
US 2015/0360932 A1    Dec. 17, 2015

Related U.S. Application Data

(63) Continuation of application No. 14/082,272, filed on Nov. 18, 2013, now Pat. No. 9,133,012.

(51) Int. Cl.
*B67D 7/34* (2010.01)
*H04L 29/06* (2006.01)
(Continued)

(52) U.S. Cl.
CPC ............... *B67D 7/348* (2013.01); *B67D 7/04* (2013.01); *B67D 7/06* (2013.01); *G06F 21/31* (2013.01);
(Continued)

(58) Field of Classification Search
CPC .. B67D 7/348; B67D 7/04; B67D 7/06; H04L 63/061; H04L 63/0428;
(Continued)

(56) References Cited

U.S. PATENT DOCUMENTS

| 4,907,268 A | 3/1990 | Bosen et al. |
|---|---|---|
| 5,636,280 A | 6/1997 | Kelly |

(Continued)

FOREIGN PATENT DOCUMENTS

| EP | 0993999 A2 | 4/2000 |
|---|---|---|
| EP | 1035462 A1 | 9/2000 |
| EP | 2037651 A1 | 3/2009 |

OTHER PUBLICATIONS

U.S. Appl. No. 14/082,272, Systems and Methods for Fuel Dispenser Security, Nov. 18, 2013.
(Continued)

*Primary Examiner* — Matthew Smithers
(74) *Attorney, Agent, or Firm* — Mintz Levin Cohn Ferris Glovsky and Popeo, P.C.

(57) ABSTRACT

Systems and methods for fuel dispenser security are disclosed herein. In some embodiments, a user seeking access to a protected function of the fuel dispenser is presented with a challenge that is encrypted using a secret key that is unique to the fuel dispenser. To access the secured function, the user must obtain a session password from a server which authenticates the user, decrypts the challenge using a counterpart of the secret key, determines whether the user is authorized to access the secured function, and returns the session password extracted from the challenge only when the user is authorized. The server can thus control access to certain fuel dispenser functions according to a set of user access privileges. The challenge can also include additional information which can be used by the fuel dispenser and/or by the server to store a log of access activity.

20 Claims, 5 Drawing Sheets

(51) Int. Cl.
*B67D 7/04* (2010.01)
*B67D 7/06* (2010.01)
*G06F 21/31* (2013.01)
*G06Q 10/10* (2012.01)
*G06Q 50/06* (2012.01)

(52) U.S. Cl.
CPC ............ *G06Q 10/10* (2013.01); *G06Q 50/06* (2013.01); *H04L 63/0428* (2013.01); *H04L 63/061* (2013.01); *H04L 63/0876* (2013.01)

(58) Field of Classification Search
CPC ..... H04L 63/0876; G06F 21/31; G06Q 10/10; G06Q 50/06
See application file for complete search history.

(56) References Cited

U.S. PATENT DOCUMENTS

| | | | |
|---|---|---|---|
| 6,119,110 A * | 9/2000 | Carapelli | B67D 7/08 235/94 A |
| 6,185,307 B1 | 2/2001 | Johnson, Jr. | |
| 6,229,894 B1 * | 5/2001 | Van Oorschot | G06F 21/6209 709/229 |
| 6,363,299 B1 * | 3/2002 | Hartsell, Jr. | B67D 7/145 700/236 |
| 6,442,448 B1 | 8/2002 | Finley et al. | |
| 6,470,288 B1 * | 10/2002 | Keidel | B67D 7/08 222/27 |
| 6,883,095 B2 | 4/2005 | Sandhu et al. | |
| 7,636,840 B2 | 12/2009 | Tang | |
| 8,444,014 B2 | 5/2013 | McSpadden et al. | |
| 9,133,012 B2 * | 9/2015 | Bergqvist | H04L 63/061 |
| 9,139,414 B2 * | 9/2015 | Bergqvist | B67D 7/085 |
| 2003/0021417 A1 * | 1/2003 | Vasic | G06F 17/30067 380/277 |
| 2003/0028813 A1 | 2/2003 | Lewis | |
| 2004/0010711 A1 | 1/2004 | Tang et al. | |
| 2005/0147250 A1 | 7/2005 | Tang | |
| 2005/0262027 A1 | 11/2005 | Hutchinson et al. | |
| 2008/0040287 A1 | 2/2008 | Harrell et al. | |
| 2008/0295568 A1 | 12/2008 | Nanaji et al. | |
| 2008/0301776 A1 | 12/2008 | Weatherford | |
| 2012/0278479 A1 | 11/2012 | Miller et al. | |
| 2013/0085944 A1 | 4/2013 | Fielder | |
| 2014/0089174 A1 | 3/2014 | Carapelli et al. | |
| 2014/0263629 A1 * | 9/2014 | McQuade | G07F 7/12 235/381 |
| 2014/0327778 A1 | 11/2014 | McQuade et al. | |
| 2014/0337234 A1 | 11/2014 | Tang et al. | |
| 2015/0120476 A1 * | 4/2015 | Harrell | G06Q 20/202 705/21 |

OTHER PUBLICATIONS

U.S. Appl. No. 14/082,278, Systems and Methods for Fuel Dispenser Security, Nov. 18, 2013.
International Search Report issued in PCT/IB2014/003055 mailed Jun. 12, 2015 (4 pages).

\* cited by examiner

SYSTEMS AND METHODS FOR FUEL DISPENSER SECURITY

CROSS REFERENCE TO RELATED APPLICATIONS

The present application is a continuation of U.S. application Ser. No. 14/082,272, filed on Nov. 18, 2013, and entitled "Systems and Methods for Fuel Dispenser Security," which is incorporated herein by reference in it's entirety.

FIELD

The subject matter disclosed herein generally relates to systems and methods for fuel dispenser security.

BACKGROUND

A typical fueling environment includes one or more fuel dispensers which can be used by a customer to dispense fuel into a vehicle, a portable fuel tank, or other equipment. From time to time, it is necessary for service personnel, government or regulatory officials, or other parties to access special features of the fuel dispenser, such as service logs, calibration functions, diagnostic functions, and so forth. Existing fuel dispensers employ various security mechanisms in an effort to prevent unauthorized access to such features. For example, some fuel dispensers require a simple password to access certain functions of a computer system in the fuel dispenser. By way of further example, some fuel dispensers include a lockable door that covers the service portion of the fuel dispenser, or a mechanical seal that can provide evidence of tampering if the seal is broken. Most existing security systems and methods, however, can be easily circumvented by malicious parties. Accordingly, a need exists for improved systems and methods for fuel dispenser security.

BRIEF DESCRIPTION

Systems and methods for fuel dispenser security are disclosed herein. In some embodiments, a user seeking access to a protected function of the fuel dispenser is presented with a challenge that is encrypted using a secret key that is unique to the fuel dispenser. To access the secured function, the user must obtain a session password from a server which authenticates the user, decrypts the challenge using a counterpart of the secret key, determines whether the user is authorized to access the secured function, and returns the session password extracted from the challenge only when the user is authorized. The server can thus control access to certain fuel dispenser functions according to a set of user access privileges. The challenge can also include additional information which can be used by the fuel dispenser and/or by the server to store a log of access activity.

In some embodiments, a system includes a fuel dispenser memory that stores a secret key that is unique to the system and a fuel dispenser processor coupled to the memory. The processor is programmed to receive a request to access a function of the system on behalf of a user, generate a challenge that includes a session password and a function code corresponding to the requested function, encrypt the challenge using the secret key stored in the memory, output the encrypted challenge, prompt for the session password, and allow access to the requested function only when a password matching the session password is received.

In some embodiments, a security server includes a network interface configured to communicate with a user device and a fuel dispenser database that includes, for each of a plurality of fuel dispensers, a unique identifier that identifies the fuel dispenser and a counterpart of a secret key stored in the fuel dispenser and that is unique to the fuel dispenser. The security server also includes a user access database that includes, for each of a plurality of users, a unique user identification that identifies the user, authentication information associated with the user, and one or more access privileges defined for the user. The security server also includes a processor coupled to the network interface, the fuel dispenser database, and the user access database. The processor is programmed to receive from the user device, via the network interface, a unique identifier of a fuel dispenser for which a user of the user device seeks access and an encrypted challenge generated by said fuel dispenser. The processor is also programmed to query the user access database to determine, based on user identification and authentication information provided by the user device, whether the user is an authorized user of the server. The processor is also programmed to, when the user is an authorized user of the server, query the fuel dispenser database to obtain the counterpart secret key associated in the fuel dispenser database with the unique identifier received from the user device. The processor is also programmed to decrypt the encrypted challenge using the secret key obtained from the fuel dispenser database, extract a function code and a session password from the decrypted challenge, query the user access database to determine whether the user is authorized to access a function represented by the function code, and, when the user is authorized to access said function, send the session password to the user device via the network interface.

In some embodiments, a method for accessing a secured function of a system on behalf of a user seeking access to the secured function using a client computer processor coupled to a security server by a network interface includes requesting access to the secured function through a user interface of the system. The method also includes obtaining from the system a unique identifier associated with the system, obtaining from the system an encrypted challenge that includes a function code corresponding to the secured function and a session password, the encrypted challenge being encrypted using a secret key that is unique to the system and that is stored in a memory of the system, and sending user authentication information of the user to the security server using the client computer processor and the network interface, the security server being in communications coupling with a user access database and a system database in which a counterpart of the secret key is stored in association with the unique identifier of the system. The method also includes sending the unique identifier and the encrypted challenge to the security server using the client computer processor and the network interface, when the user is authorized in the user access database to access the secured function, receiving the session password from the security server using the client computer processor and the network interface after the security server decrypts the encrypted challenge using the counterpart of the secret key and extracts the session password, and providing the session password to the system through the user interface to obtain access to the secured function.

In some embodiments, a fuel dispenser includes a flow meter configured to measure a quantity of fuel dispensed by the fuel dispenser and a computer processor coupled to a memory and configured to selectively prevent fuel from being dispensed through the flow meter. The computer processor is programmed to detect a change in calibration of the flow meter, prevent fuel from being dispensed using the flow meter when a calibration change is detected until a verification function is performed, generate a challenge that includes a session password, encrypt the challenge using a secret key stored in the memory of the fuel dispenser, provide the encrypted challenge to a user seeking to perform the verification function, and allow the verification function to be performed only when a password matching the session password is received from the user.

In some embodiments, a fuel dispenser includes a flow meter configured to measure a quantity of fuel dispensed by the fuel dispenser and a computer processor coupled to a memory and configured to selectively prevent fuel from being dispensed through the flow meter. The computer processor is programmed to prevent changes in calibration of the flow meter until a calibration function is performed, generate a challenge that includes a session password, encrypt the challenge using a secret key stored in the memory of the fuel dispenser, provide the encrypted challenge to a user seeking to perform the calibration function, and allow the calibration function to be performed only when a password matching the session password is received from the user.

In some embodiments, a security method for execution by a fuel dispenser having a flow meter configured to measure a quantity of fuel dispensed by the fuel dispenser and a computer processor coupled to a memory and configured to selectively prevent fuel from being dispensed through the flow meter includes using the processor to detect a change in calibration of the flow meter. The method also includes using the processor to prevent fuel from being dispensed using the flow meter after a calibration change is detected until a verification function is performed, generate a challenge that includes a session password, encrypt the challenge using a secret key stored in the memory of the fuel dispenser, provide the encrypted challenge to a user seeking to perform the verification function, and allow the verification function to be performed only when a password matching the session password is received from the user.

BRIEF DESCRIPTION OF THE DRAWINGS

These and other features will be more readily understood from the following detailed description taken in conjunction with the accompanying drawings, in which.

Figure 1:
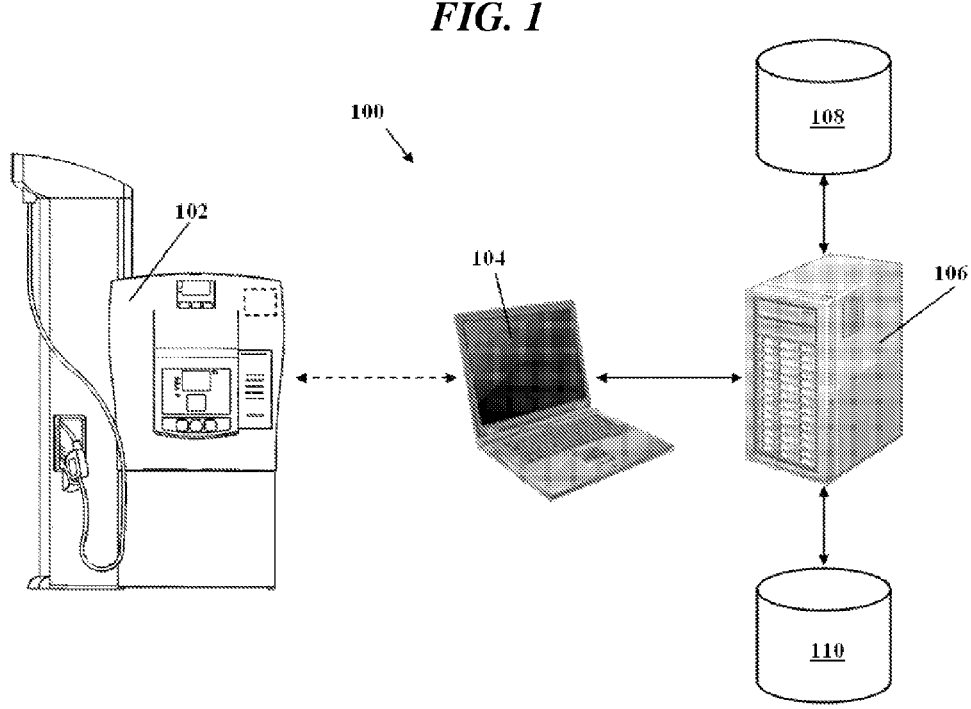
FIG. 1 is a schematic diagram of one exemplary embodiment of a fueling environment.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the systems and methods disclosed herein.

Systems and methods for fuel dispenser security are disclosed herein. In some embodiments, a user seeking access to a protected function of the fuel dispenser is presented with a challenge that is encrypted using a secret key that is unique to the fuel dispenser. To access the secured function, the user must obtain a session password from a server which authenticates the user, decrypts the challenge using a counterpart of the secret key, determines whether the user is authorized to access the secured function, and returns the session password extracted from the challenge only when the user is authorized. The server can thus control access to certain fuel dispenser functions according to a set of user access privileges. The challenge can also include additional information which can be used by the fuel dispenser and/or by the server to store a log of access activity.

Fueling Environment

FIG. 1 illustrates an exemplary embodiment of a fueling environment 100 in which one or more of the systems and methods disclosed herein can be implemented. Although a fueling environment 100 is shown and described, it will be appreciated that the systems and methods disclosed herein can be readily applied in other settings, e.g., any setting in which it is necessary to prevent or reduce unauthorized access to a device or system. The fueling environment 100 generally includes a fuel dispenser 102 for dispensing fuel, a user device 104 associated with a user (e.g., service personnel or regulators seeking access to the fuel dispenser), and a security server 106. The server 106 can include or can be in communication with one or more databases, such as a fuel dispenser database 108 and a user access database 110.

The fuel dispenser 102 can include various features well understood by those skilled in the art, such as a nozzle, a pump, a meter, buttons for selecting fuel grade, an electronic display screen, a payment terminal, and so forth. The fuel dispenser 102 can also include a computer system, as described below.

The user device 104 can be or can include any device that is configured to exchange data over a communications network, such as a mobile phone, tablet computer, laptop computer, desktop computer, telephone, and so forth. The user device 104 can be configured to communicate with the server 106 over a network. Exemplary networks include cellular voice and data networks, the Internet, local area networks, wide area networks, landline telephone networks, Wi-Fi networks, fiber optic networks, and so forth. The user device 104 can be or can include a computer system, as described below. In some embodiments, the user device 104 can be configured to communicate with the fuel dispenser 102 over a network, for example via a wireless connection (e.g., near-field communication (NFC), Wi-Fi, Bluetooth, IR, and the like) and/or a wired connection (e.g., USB, serial COM port, Ethernet, and the like). For example, in some embodiments, the user device 104 can be a remote control configured to transmit various information to the fuel dispenser 102, which can provide feedback on a sales display. In the present disclosure, functions described as being performed by a user can also be performed by the user device 104 and vice versa unless the context suggests otherwise, as will be readily understood by those skilled in the art.

The server 106 can be or can include any device that is configured to receive, process, and/or respond to requests from one or more remote users. The server 106 can perform various functions, such as user authentication, database querying, and activity logging. The server 106 can be or can include a computer system, as described below.

In the fueling environment 100, each of a plurality of fuel dispensers (of which there may be as few as two and as many as several thousand, million, or more worldwide) is assigned a unique identifier that can be used to distinguish that particular fuel dispenser from all other fuel dispensers in a given set (e.g., all fuel dispensers made by a particular manufacturer throughout the world, all fuel dispensers of a particular model or series, all fuel dispensers in a geographical region, and/or combinations thereof). The unique identifier can be any unique string of letters, numbers, characters, symbols, etc. The unique identifier can be made publicly available, for example by printing the unique identifier on a decal or placard affixed to the exterior of the fuel dispenser 102. The unique identifier can also be stored in the computer system of the fuel dispenser 102 (e.g., in a non-volatile memory or storage medium) and can be accessible through a user interface for display to a user on an electronic display screen of the fuel dispenser or a computer system in communications coupling with the fuel dispenser. The unique identifier can be assigned and stored in the fuel dispenser 102 when the fuel dispenser is manufactured or when the fuel dispenser is commissioned in the field.

The computer system of the fuel dispenser 102 also stores a secret key that is not publicly available. In other words, the secret key is not printed on the exterior of the fuel dispenser 102, is accessible only by the internal software of the fuel dispenser, and is never displayed to users or is only displayed in the rare instance that a user is authenticated to view such information. The secret key can be randomly generated and can be stored in the computer system of the fuel dispenser 102 in a controlled environment, such as during manufacture of the computer system or a component thereof. The secret key can be any arbitrary or random string or sequence of letters, numbers, characters, symbols, etc. For example, the secret key can be a random 256 bit number. The secret key can be unique to the fuel dispenser in which it is installed, such that no two fuel dispensers have the same secret key. In some embodiments, the secret key can be stored in a secure element of the computer system. The secure element can be a tamper-resistant platform (e.g., a one-chip secure microcontroller) capable of securely hosting applications and their confidential and cryptographic data (e.g., key management) in accordance with the rules and security requirements set forth by a set of well-identified trusted authorities. The secure element can be capable of providing random number generation, generating device-specific keys, and executing security algorithms. Known examples of security algorithms include, but are not limited to: Hash, TDES, AES, RSA, CRC, etc. Exemplary secure elements include Universal Integrated Circuit Cards (UICC), embedded secure elements, "program-once" non-volatile memory, and micro secure digital (microSD) cards.

The fuel dispenser database 108 stores an index that associates each of a plurality of fuel dispensers 102 (identified by their respective unique identifiers) with the corresponding secret key stored in that fuel dispenser. The database 108 can be updated when new fuel dispensers or new fuel dispenser computer systems are manufactured. Thus, in an exemplary embodiment, when a fuel dispenser having the unique identifier "M2345-7890A" is manufactured, a secret key such as "834j8fyq8y48j8y3" is generated and stored in the computer system of the fuel dispenser. An entry is created that associates fuel dispenser "M2345-7890A" with secret key "834j8fyq8y48j8y3" and the entry is added to the fuel dispenser database 108. The database 108 thus stores a counterpart of the secret key installed in each of the fuel dispensers listed in the database. The counterpart key can be a copy of the secret key or can be a corresponding key in an asymmetrical key pair. The database 108 can also store region or location information for each of the plurality of fuel dispensers. The database 108 is secured using techniques known in the art such that only the server 106 or other authorized systems or users can access the database.

The user access database 110 stores an index that associates each of a plurality of users (identified by respective unique user identification, such as a username or employee number) with authentication information and one or more access privileges. When a user attempts to access the server 106, they are required to provide information which is compared to the authentication information stored in the user access database 110 to determine whether the user is authorized to access the server. The authentication information can include various known types such as username and password combinations, fingerprint or retina scans, facial recognition, and the like.

The access privileges stored in the user access database 110 define the scope of access to fuel dispensers that each user is permitted. Access privileges can stipulate which fuel dispensers a user may access, which features within a particular fuel dispenser the user may access, dates and times the user may access a fuel dispenser, geographic limitations on which fuel dispensers the user can access, and so forth. Access privileges can be added, removed, or updated by a system administrator.

Computer System

Figure 2:
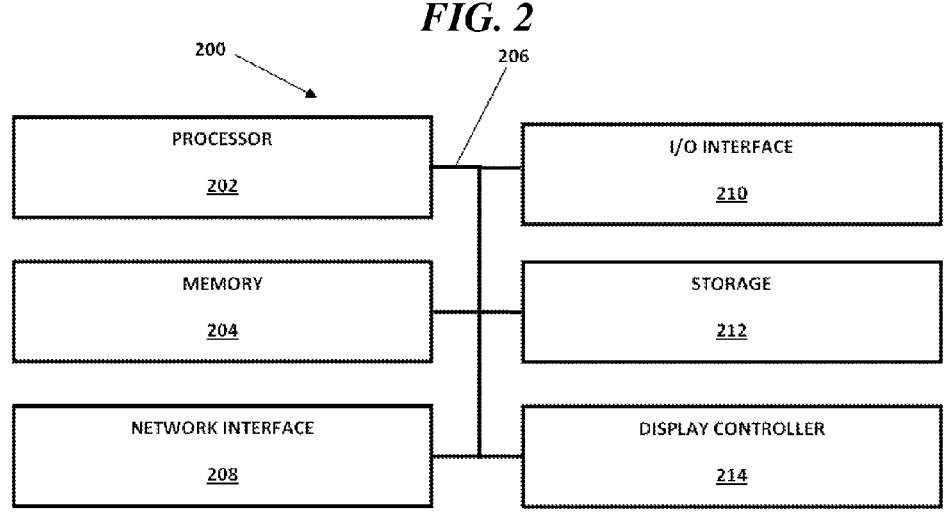
FIG. 2 is a schematic diagram of one exemplary embodiment of a computer system.

As noted above, the fuel dispenser 102, the user device 104, and the server 106 can each include or be implemented using one or more computer systems. FIG. 2 illustrates an exemplary architecture of a computer system 200. Although an exemplary computer system is depicted and described herein, it will be appreciated that this is for sake of generality and convenience. In other embodiments, computer systems that differ in architecture and operation from that shown and described here can be used for any of the fuel dispenser 102, the user device 104, and the server 106.

The computer system 200 can include a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multi-processor systems.

The computer system 200 can also include a memory 204, which provides temporary or permanent storage for code to be executed by the processor 202 or for data that is processed by the processor 202. The memory 204 can include read-only memory (ROM), flash memory, one or more varieties of random access memory (RAM), and/or a combination of memory technologies.

The various elements of the computer system 200 can be coupled to one another. For example, the processor 202 can be coupled to the memory 204. The various elements of the computer system 200 can be directly coupled to one another or can be coupled to one another via one or more intermediate components. In the illustrated embodiment, the various elements of the computer system 200 are coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 can also include a network interface 208 which enables the computer system 200 to communicate with remote devices (e.g., other computer systems) over a network. In the case of the user device 104, the network interface can facilitate communication with the server 106. In the case of the server 106, the network interface can facilitate communication with the user device 104 and the databases 108, 110.

The computer system 200 can also include an input/output (I/O) interface 210 which facilitates communication between one or more input devices, one or more output devices, and the various other components of the computer system 200. Exemplary input and output devices include keypads, touch screens, buttons, magnetic-stripe card readers, lights, speakers, IR remote controls, dispenser sales displays, and so forth.

The computer system 200 can also include a storage device 212, which can include any conventional medium for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, USB drives, optical drives, various media disks or cards, memory technologies, and/or any combination thereof and can be directly connected to the other components of the computer system 200 or remotely connected thereto, such as over a network.

The computer system 200 can also include a display controller 214 which can include a video processor and a video memory, and can generate images to be displayed on one or more electronic displays in accordance with instructions received from the processor 202.

The various functions performed by the computer systems of the fuel dispenser 102, the user device 104, and the server 106 can be logically described as being performed by one or more modules or units. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums, or can be transmitted as a signal, carrier wave, etc. Functions disclosed herein as being performed by a particular module can also be performed by any other module or combination of modules, and the fuel dispenser 102, the user device 104, and the server 106 can include fewer or more modules than what is shown and described herein. As used herein, software refers to any executable program instructions, including firmware.

Authentication Processes

The fuel dispenser 102, user device 104, and server 106 can be used in conjunction with one another to implement various systems and methods for securing the fuel dispenser 102. In particular, an authentication process can be executed by which a user is either granted or denied access to requested functionality of the fuel dispenser 102.

Figure 3:
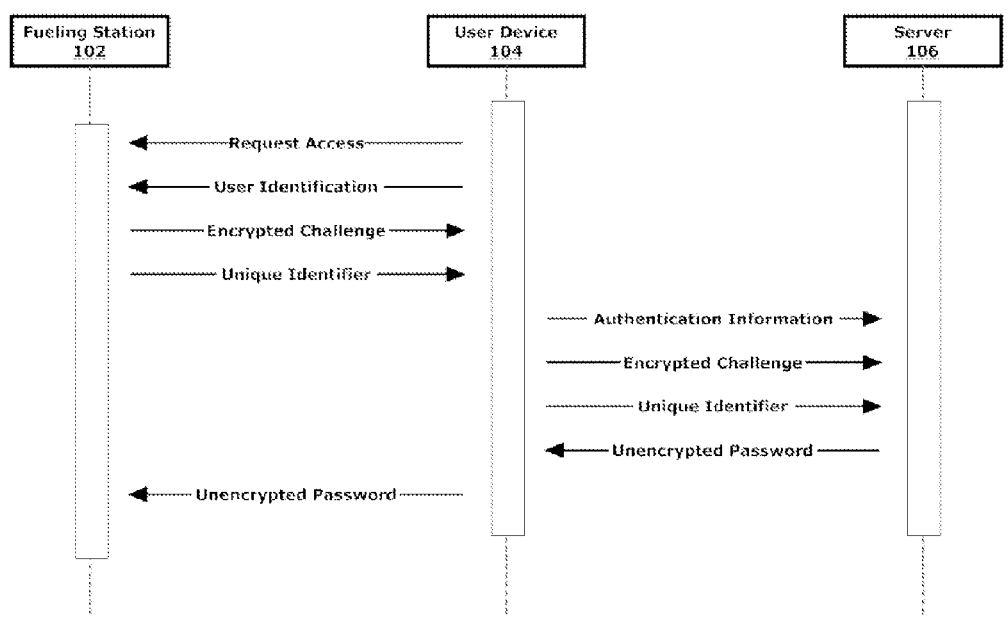
FIG. 3 is a sequence diagram of one exemplary embodiment of a method for authenticating a user.

FIG. 3 is a sequence diagram of an exemplary embodiment of an authentication process. The process can be used to authenticate a user (e.g., a service person or regulator) for purposes of allowing access to certain features of the fuel dispenser 102. While various methods disclosed herein may be shown in relation to sequence diagrams or flowcharts, it should be noted that any ordering of method steps implied by such sequence diagrams, flowcharts, or the description thereof is not to be construed as limiting the method to performing the steps in that order. Rather, the various steps of each of the methods disclosed herein can be performed in any of a variety of sequences. In addition, as the illustrated sequence diagrams and flowcharts are merely exemplary embodiments, various other methods that include additional steps or include fewer steps than illustrated are also within the scope of the present disclosure.

As shown in FIG. 3, the authentication process begins with a user (e.g., a field technician) requesting access to the fuel dispenser 102 or to a specific functionality, parameter, log, or other protected operation of the fuel dispenser. A user can manually request access by navigating to a specific menu within a user interface of the fuel dispenser or by actuating one or more user interface elements of the fuel dispenser such as keys, buttons, and so forth. A user can also request access through the user device 104, for example in embodiments in which the user device is coupled to the fuel dispenser 102 over a communications channel. In some embodiments, access to a function is requested by entering or selecting a function code. The function code can include a function code portion and a sub-function code portion, and can be provided in various formats such as binary coded decimal. A plurality of functions or sub-functions can be specified with a function code that includes one or more wild cards.

The request for access can also include the user identification associated with the user requesting access. As detailed above, each authorized user possesses a unique user identification registered with the server 106 and the user access database 110 that can be used to distinguish that individual user from all other authorized users. The unique identification can be provided to the fuel dispenser 102 in various ways. For example, the user can type the user identification into the computer system of the fuel dispenser 102 using an input device such as a touch screen or keypad. By way of further example, the user can plug an encrypted dongle, memory card, or other hardware storing the user identification into the computer system to communicate the user identification to the fuel dispenser 102. The username can also be communicated to the fuel dispenser 102 automatically using the user device 104.

In response to the request for access, the fuel dispenser 102 generates a challenge which is communicated to the user. As used herein, the term "challenge" refers to any message, data, or code that can be communicated to a user. The challenge can be communicated to the user in various ways. For example, the challenge can be displayed on an electronic display screen of the fuel dispenser or can be sent over a communications channel to the user device 104. In some embodiments, the fuel dispenser 102 can be directly connected to the server 106 without requiring an intermediate user or user device (e.g., via a central fuel dispenser management system coupled to the server by a network), and the challenge can be communicated to the server by the fuel dispenser itself. The challenge can include various components which can be used to convey information to the server 106 when the challenge is eventually communicated to the server as discussed below. For example, the challenge can include one or more of the following components:

Unique Identifier—the challenge can include the unique identifier or serial number of the fuel dispenser 102 or the fuel dispenser's computer system, which can be used by the server 106 to determine which specific fuel dispenser is being accessed.

Function Code—the challenge can also include the function code and/or sub-function code, which may include wildcards, corresponding to the function(s) for which access is requested.

User Identification—the challenge can also include the user identification of the user who is requesting access.

Status Indicator—the challenge can also include a status indicator that represents the security status of the fuel dispenser 102. The status indicator can be set to a certain value to indicate that the fuel dispenser 102 has detected a security breach or encountered some critical error, and thus the status indicator can alert the server 106 to problems with the fuel dispenser.

Session Password—the challenge can also include a session password, which can be a random number generated by the computer system of the fuel dispenser 102, for example using a high resolution timer such as real-time operating system (RTOS) timer. The session password can be unique to each session or access attempt, and can expire after a predetermined time period.

The above challenge components are merely exemplary, and it will be appreciated that the challenge can include additional components or fewer components than described herein. The components of the challenge can be assembled via hashing, concatenation, multiplication, other techniques, or combinations thereof. For example, the function code, session password, and status indicator can be concatenated together or combined using a logical "OR" operation to form an intermediate result. The intermediate result can then be hashed with the user identification and the unique identification of the fuel dispenser 102 to formulate an assembled challenge. The assembled challenge can then be encrypted using the secret key stored in the computer system of the fuel dispenser 102, at which point the encrypted challenge can be communicated to the user or the user device 104.

The unique identifier of the fuel dispenser 102 is also communicated to the user in an unencrypted form or, in some embodiments, in an encrypted form. The unique identifier can be communicated to the user in various ways. For example, the user can simply read the unique identifier from a decal or placard affixed to the fuel dispenser 102 or from the display screen of the fuel dispenser, or the unique identifier can be sent over a communications channel to the user device 104.

Before or after obtaining the encrypted challenge and/or the unique identifier, the user device 104 can be authenticated with the server 106. For example, the user can direct a web browser or other software installed on the user device 104 to the server 106, which can then prompt the user for authentication information of the type described above. The user can also contact a company office via telephone or other communications medium to relay the encrypted challenge and/or the unique identifier to a human or automated operator who can in turn provide such information to the server 106. The server 106 receives authentication information from the user device 104 and queries the user access database 110 to determine whether the user has provided valid credentials. The authentication information can include the user identification, such that the server 106 knows the identity of the user. Once the user is successfully authenticated to the server 106, the encrypted challenge and the unique identifier of the fuel dispenser 102 can be communicated from the user device 104 to the server 106.

The server 106 can then query the fuel dispenser database 108 with the unique identifier provided by the user to retrieve the secret key stored in the database 108 in association with that unique identifier. In other words, the server 106 retrieves from the database 108 a counterpart key to the secret key stored in the fuel dispenser 102. The counterpart key can be a copy of the same secret key that is stored in the secure element of the fuel dispenser 102 for which the user seeks access, or a corresponding key in the case of an asymmetric key encryption scheme such as RSA. The secret key retrieved from the database 108 is then used to decrypt the encrypted challenge received from the user device 104.

The server 106 can then perform the process described above for assembling the challenge in reverse order on the decrypted challenge, thereby extracting which fuel dispenser the user is trying to access, which functionality the user is trying to access, the identity of the user, the security status of the fuel dispenser, and the random session password generated by the fuel dispenser. This information can be logged by the server 106 with various other information, such as the time and date that the challenge is received, the IP or MAC address of the user device 104, etc. Suspicious activity can be flagged and, depending on the nature of the activity, can result in denial of the requested access.

The server 106 can then query the user access database 110 to determine whether the user is authorized to access the requested functionality for the requested fuel dispenser. For example, the server 106 can compare region information of the requested fuel dispenser (either included in the challenge or specified in the fuel dispenser database 108) to a list or set of regions in which the user is authorized. The server 106 also analyzes the status indicator to determine whether the fuel dispenser 102 is reporting a security breach or critical error, in which case the server can deny the requested access. By including the status indicator in the challenge that is sent to the server 106, it is not possible to obtain access to the fuel dispenser 102 without the server being informed of the presence of a breach or error reported by the fuel dispenser.

If it is determined that the user is authorized for the type of access requested, the server 106 communicates the session password that was originally generated by the fuel dispenser 102 and included in the encrypted challenge to the user device 104 in an unencrypted form. The password can also be sent to the user device 104 in an encrypted format for which the user possesses a key for decrypting the password (i.e., encrypted using a key other than the secret key of the fuel dispenser 102).

After receiving the session password, the user communicates the password to the fuel dispenser 102. For example, the password can be displayed to the user on a display of the user device 104 and the user can then manually type the password into the fuel dispenser 102 using a keypad or other user interface element. Alternatively, the password can be communicated directly from the user device 104 to the fuel dispenser 102 over a communications channel, with or without displaying the password to the user. The password can thus be communicated, in some embodiments, automatically and without user action.

Once the fuel dispenser 102 receives the password from the user or the user device 104, the fuel dispenser determines whether the password is valid. In particular, the fuel dispenser 102 retrieves the randomly generated session password that was initially included in the encrypted challenge and compares it to the session password provided by the user. If a match is found, the fuel dispenser 102 determines that the user has been authenticated by the server 106 for access to the fuel dispenser 102, or at least for access to the specific feature or set of features identified in the challenge. The now-authenticated user can then interact freely with the fuel dispenser 102 in accordance with the level of access provided. If a match is not found, the user is denied access to the requested functionality.

The session password can be valid only for a single session or activity. Accordingly, if the user attempts to access functionality outside the scope of the password, or if a predetermined time elapses, a new challenge will be generated and the user will have to execute the authentication process again.

The encrypted challenge can also include a region code, and the server 106 can be configured to determine whether the user is authorized to access fuel dispensers in the region designated by the region code before granting access to the user. This allows the fuel dispenser 102 to communicate its physical geographic location (or approximate location) to the server 106, which can compare the location information to the user's access privileges stored in the user access database 110 to determine whether access should be granted. A user can thus be restricted to servicing only those fuel dispensers in a particular area, and users with a high access grade can be prevented from serving logins to fuel dispensers outside their region (e.g., for someone else).

It will be appreciated that the above process can be completely automated via serial com protocol or other commands, such that little or no manual user action is required to carry out the authentication process.

Figure 4:
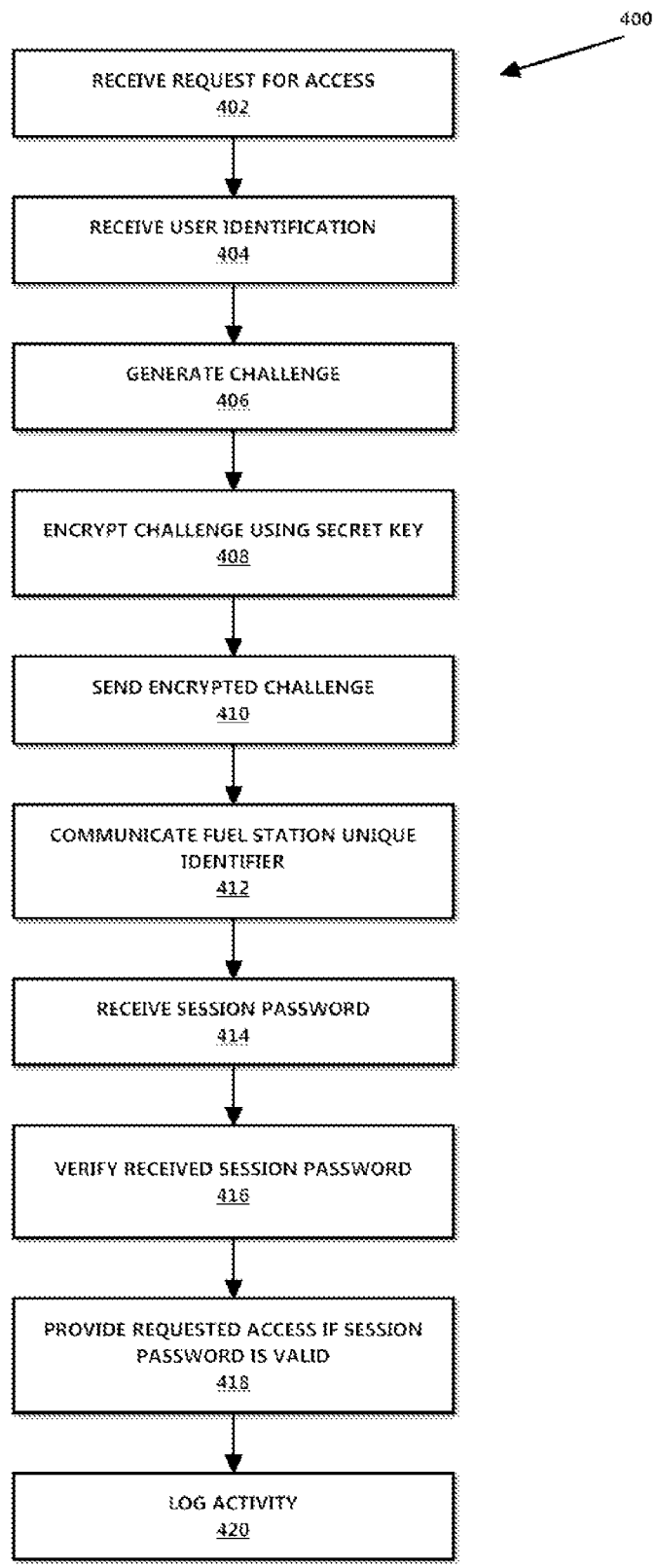
FIG. 4 is a flowchart that depicts the method of FIG. 3 from the perspective of a fuel dispenser.
Figure 5:
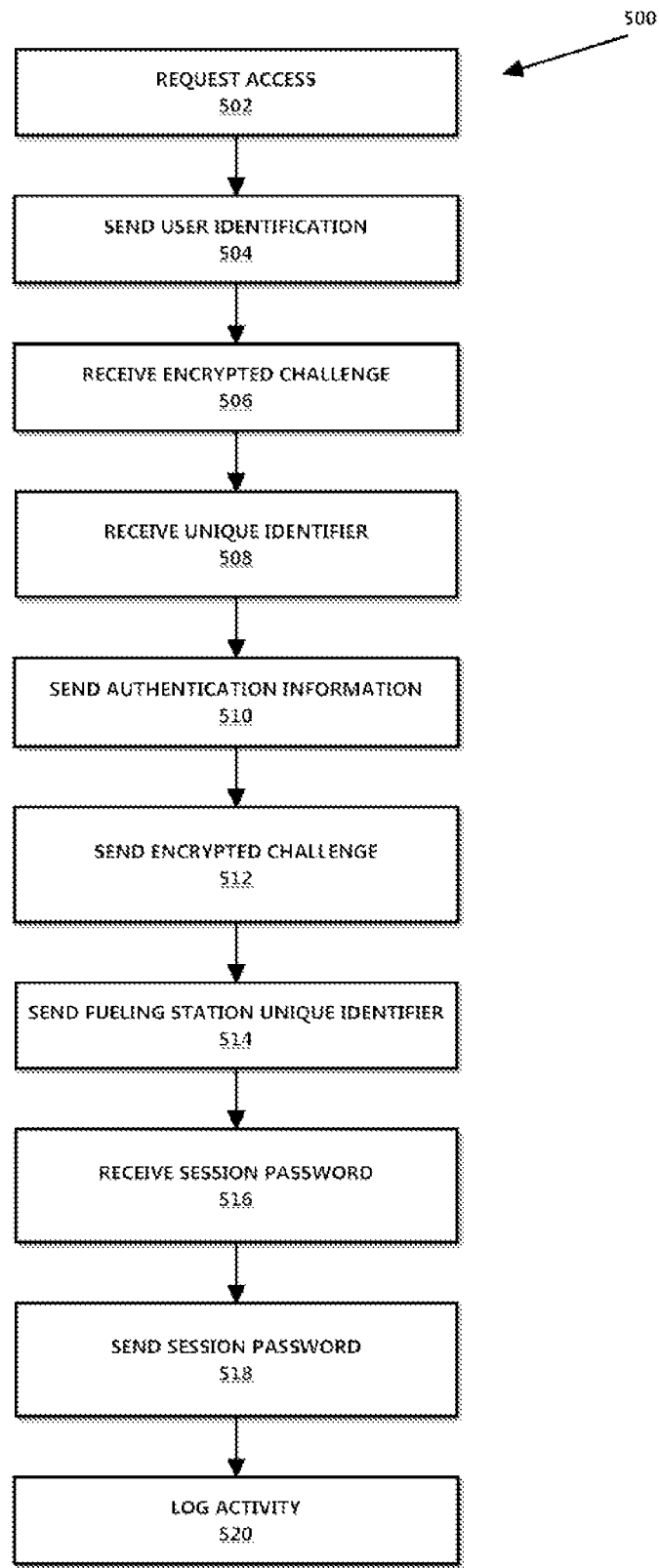
FIG. 5 is a flowchart that depicts the method of FIG. 3 from the perspective of a user device.
Figure 6:
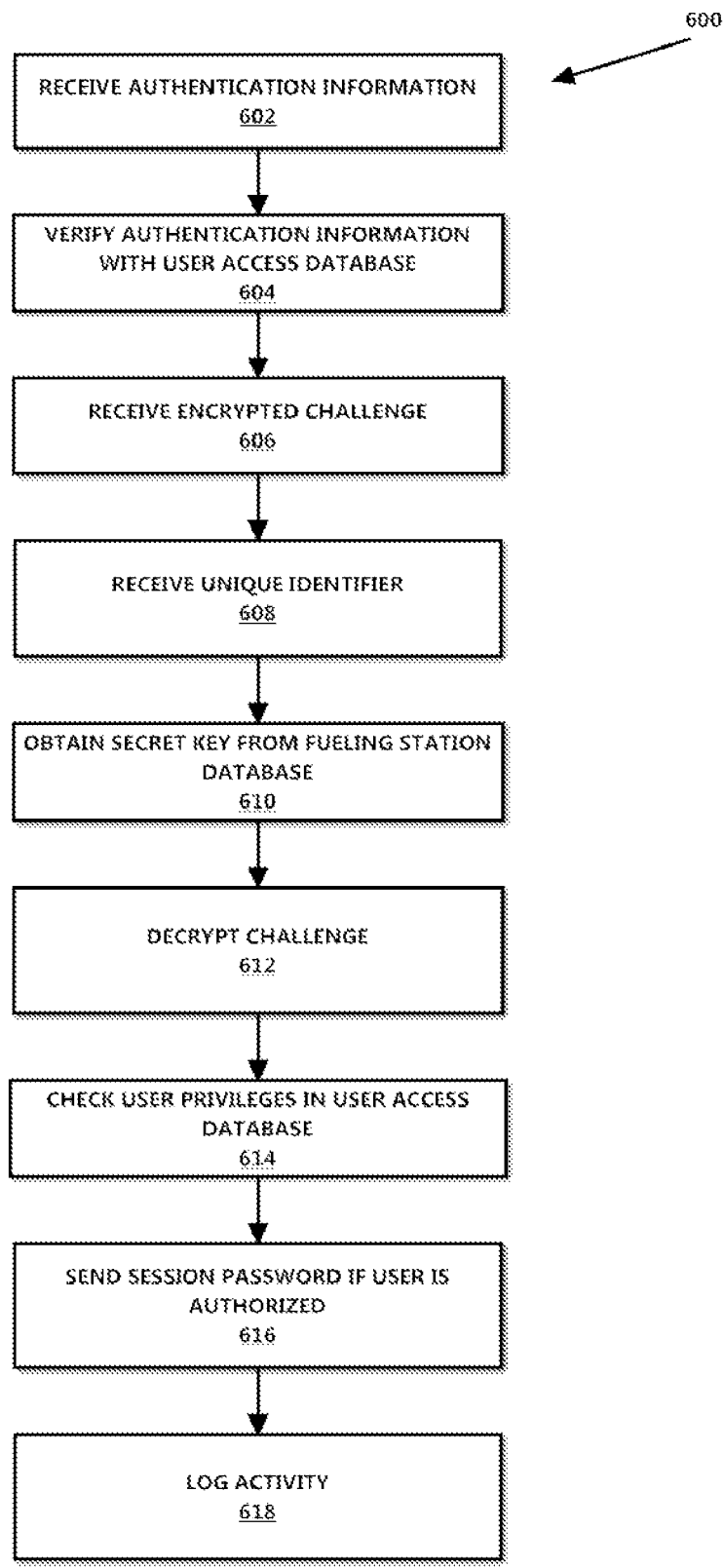
FIG. 6 is a flowchart that depicts the method of FIG. 3 from the perspective of a server.

FIGS. 4-6 illustrate the authentication method described above from the perspective of the fuel dispenser 102, the user or user device 104, and the server 106, respectively.

In FIG. 4, the method 400 begins when the fuel dispenser receives a request for access from a user or from the user device in step 402. The fuel dispenser also receives the user identification from the user or from the user device in step 404. The fuel dispenser then generates the challenge code in step 406, which can contain embedded information as to the specific functionality requested by the user. The fuel dispenser then encrypts the challenge in step 408 using the secret key stored in the fuel dispenser. The encrypted challenge is then sent to the user or to the user device in step 410. The unique identifier of the fuel dispenser is also communicated to the user or the user device in step 412. The fuel dispenser then prompts the user for a password and receives the password from the user or from the user device in step 414. The fuel dispenser then verifies the authenticity of the received session password in step 416 and, if the password is valid, provides the requested access in step 418. A log of the access activity, whether successful or unsuccessful, can be stored by the fuel dispenser in step 420.

In FIG. 5, the method 500 begins when the user or the user device requests access to the fuel dispenser or specific features or functionality of the fuel dispenser in step 502. The user or the user device also sends the user identification to the fuel dispenser in step 504. The user or the user device then receives the encrypted challenge from the fuel dispenser in step 506 and receives the unique identifier of the fuel dispenser in step 508 (e.g., by reading the unique identifier off of a decal or placard on the fuel dispenser). The user or the user device sends authentication information to the server in step 510. If the user is successful in authenticating with the server, the user or the user device sends the encrypted challenge to the server in step 512. The user or the user device also sends the unique identifier of the fuel dispenser to the server in step 514. If the user is authorized for the requested access by the server, the user or the user device receives the session password from the server in step 516. The user or the user device then forwards the session password to the fuel dispenser in step 518 and, if the password is verified by the fuel dispenser, obtains the requested access. A log of the access activity, whether successful or unsuccessful, can be stored by the user device in step 520.

In FIG. 6, the method 600 begins when the server prompts the user or the user device for authentication information and receives authentication information in step 602. In step 604, the server queries the user access database to determine whether the authentication information is valid. If the authentication information is valid, the server prompts the user for the challenge and receives the challenge in step 606. The server also prompts the user for the unique identifier of the fuel dispenser and receives the unique identifier in step 608. If the authentication information is not valid, the server denies access. In step 610, the server queries the fuel dispenser database with the unique identifier received from the user to obtain the secret key associated with the fuel dispenser in the database. The server then decrypts the challenge using the secret key in step 612. Using information extracted from the decrypted challenge, the server determines what access is requested by the user and queries the user access database in step 614 to determine whether the user is authorized to obtain the requested access. If the user is authorized, the server sends the session password to the user or to the user device in step 616. A log of the access activity, whether successful or unsuccessful, can be stored by the server in step 618.

It will be appreciated that any of a variety of functions of the fuel dispenser can be protected using the authentication scheme described above. One or more examples of such functions are provided below.

Calibration Verification

Verification of a calibration procedure can be one of the functions of the fuel dispenser 102 protected using the authentication scheme described above. In some embodiments, the fuel dispenser 102 can detect when a meter portion of the fuel dispenser has been calibrated. When calibration is detected, the fuel dispenser can block or limit the newly-calibrated meter from further use (i.e., prevent fuel from being dispensed using that meter, either immediately or after a predetermined time elapses without a successful verification) until an authorized party confirms that the calibration is acceptable or non-fraudulent (i.e., performs a verification function). The authentication process described above can be used to ensure that only authorized parties can perform the verification function. As used herein, the term "verification function" includes a function for confirming that a calibration was performed correctly or accurately, a function for confirming that a calibration was authorized, as well as a combination of such functions.

In an exemplary embodiment, the fuel dispenser 102 includes a flow meter that measures the volumetric flow rate of fuel as it is dispensed. The flow meter can include an encoder coupled to a rotatable flow meter shaft. As fuel is dispensed, the flow meter shaft rotates and the encoder generates a pulse train signal that is received by the computer system and processed to determine the volume of fuel dispensed. Such processing can include multiplying the measured flow rate by a calibration factor. The calibration factor can be stored in a memory and can be manually or automatically set to compensate for inaccuracies that can result from aging or wear of the meter. It will be appreciated that the flow meter described herein is merely exemplary, and that any of a variety of flow meters can be used, including those in which a Hall effect sensor is used to read a magnetic disc located inside the fluid.

The computer system of the fuel dispenser 102 can detect calibration changes to the flow meter in various ways. For example, the computer system can continuously monitor for changes in the calibration factor using polling or interrupt based techniques over a communication channel such as a serial communication interface. In fuel dispensers 102 with a plurality of flow meters, each meter can have a unique identifier or serial number that can be used to distinguish that meter from other meters in the fuel dispenser. When the computer system detects that a fuel meter has been calibrated or adjusted, the computer system prevents that particular fuel meter from being used (by not allowing fueling to start on the nozzle to which the specific meter is mapped). The calibrated fuel meter is locked out until an authorized person (e.g., a government official, notifying body, or third party verification agency) electronically confirms that the calibration is acceptable.

To ensure that not anyone can perform this verification (or authorization) function, the authentication process described above can be used. The computer system of the fuel dispenser 102 will only unlock the recently-calibrated meter when a user successfully completes the authentication process for the verification function.

Requests for access to the verification function can be logged at the server level. This log information can be provided to metrology agencies to inspect the verification history or patterns for one of more fuel dispensers and identify cases of fraud. Completed and/or attempted verification functions can also be logged by the fuel dispenser in a log entry that includes the unique identification of the user that performed the verification. This acts as a secure "electronic seal" allowing the fuel dispenser itself to maintain a record of when calibrations were verified and who performed the verification.

It can be desirable in some embodiments to provide an additional layer of security that is controlled in part or in whole by a regulatory authority. In such embodiments, for example, the fuel dispenser 102 can store a second secret key in addition to the first secret key. The second key can be injected into the fuel dispenser 102 at the time the fuel dispenser is first commissioned for use by the regulatory authority or their agent or at some other time, and a counterpart of the second key can be stored in a database maintained by the regulatory authority or their agent. The database can also be controlled or maintained by other parties (e.g., the same party that controls the server 104 and/or the fuel dispenser database 108), in which case the regulatory authority can be provided with an interface for adding, removing, and updating records in the database. Accordingly, access to certain functions which are specific to regulators (e.g., verification functions) can require an additional step in the process above, in which the second secret key must be retrieved from the regulatory database in order for the server to decrypt the encrypted challenge. Because both keys are required, theft of the second secret key at the time the fuel dispenser is commissioned would not be enough to obtain access, as the first secret key would still be required. Such embodiments can provide increased confidence to regulators that the system is secured against unauthorized calibrations or verifications.

Calibration Procedures

In a similar manner, the fuel dispenser 102 can be configured to disable fuel meter calibration until a user completes the authentication process above for a calibration function. In this case, the computer system of the fuel dispenser 102 does not allow the meter to be calibrated unless a calibration function is authorized. In order to enable calibration of the meter, the authentication process described above must be completed. It is thus possible to control who can perform calibrations of fuel dispensers in the network controlled by the server 106. The administrator of the network can thus restrict certain parties (e.g., dishonest parties) from calibrating fuel dispensers.

Software Installation

Another function that can be protected using the authentication scheme described above is the installation of software (e.g., firmware upgrades) on the computer system of the fuel dispenser 102.

The firmware of the computer system might be updated several times during the system's lifetime to fix bugs, add new functionality, or adhere to new regulatory requirements. To prevent the installation of software or firmware that has been tampered with, the binary or executable file embodying the software or firmware can be encrypted using the secret key stored in the fuel dispenser. Accordingly, only parties with access to the secret key (e.g., the manufacturer of the fuel dispenser) can decrypt the software which prevents tampering. In addition, the act of installing the software can be a function protected by the above authentication scheme, such that only authorized users can install software and such that a log of who performed the software installation is maintained.

By having unique keys in each fuel dispenser, each binary can be individually encrypted. An engineer or developer who formerly worked for the fuel dispenser manufacturer will not have access to the individual keys and therefore cannot encrypt and sign a malicious or manipulated derivate of the software.

Authentication of Fuel Dispenser Computer System

Another way in which the security of a fuel dispenser can be compromised is when a malicious party removes the computer system of the fuel dispenser and replaces it with an unprotected computer system on which malicious code is installed. The unique identifier associated with each computer system is publicly-available, as described above, and can thus be loaded into such malicious replacement systems in an effort to avoid detection.

Because each fuel dispenser has a unique secret key, however, it is possible to detect that the computer system has been replaced by performing an authentication procedure. For example, the server 104 can transmit a test message or file encrypted using the secret key associated in the database 108 with a particular fuel dispenser to the fuel dispenser itself or to an intermediate user device 104. The fuel dispenser 102 can then be requested to decrypt the test message using the secret key stored in the fuel dispenser. The decrypted result is then sent to the server 106, which compares it with the original, unencrypted test message. If no match is found, the server 106 determines that the secret key stored in the computer system is invalid, and therefore that the computer system has been tampered with. The server 106 can then take responsive action, such as blocking future access to the fuel dispenser 102, informing regulatory bodies, or initiating a service call by an authorized representative to remove the malicious computer system.

Fuel Dispenser Activity Logging

As noted above, the fuel dispenser 102 can be configured to maintain an activity log of service or other functions performed at the fuel dispenser. The log can include the user identification provided by the user, such that a record of who has accessed certain functionality within the fuel dispenser is maintained at the fuel dispenser itself. This log can be accessible by regulatory authorities or other parties who may not have access to records maintained by the server 106. The log can be stored in and maintained by the computer system of the fuel dispenser 102, for example in a storage unit of the computer system.

Technical Effects

The systems and methods disclosed herein can produce a number of technical effects.

In existing fueling environments, the service of fuel dispensers is done by many different service companies over the lifetime of the fuel dispenser. It is not necessarily the manufacturer or producer of the fuel dispenser that has a contract to service the fuel dispenser, but may instead be a competitor or other third party. In addition, field technicians sometimes move from one service company to another. In some embodiments of the systems and methods disclosed herein, a new session password is used for virtually every service access. This prevents the password from being passed on from one user to another. The password strength can also be such that there are several million, billion, or more password permutations, thus making the password resistant to brute force cracking efforts.

In addition, in some embodiments of the systems and methods disclosed herein, the encrypted challenge contains information on the specific operation or operations for which access is requested. It is thus possible to provide feature-specific access rights to different users or accounts. Furthermore, by using a randomly-generated secret key for each fuel dispenser, knowledge of the security algorithm or any static hash-tables or similar is insufficient to obtain access. Rather, one must access the secret random key, which is well-protected (e.g., generated and programmed in a controlled environment, stored in a secure element, etc.). Using such systems and methods, the operator of the server 106 can control each and every access attempt, optionally on a feature-specific basis, to all fuel dispensers that employ this authentication method.

This approach can provide superior security as compared with systems in which a static key which is the same for all fuel dispensers or a common default password for each fuel dispenser is used.

In some embodiments of the systems and methods disclosed herein, the fuel dispenser can be secured by an electronic seal. In existing fueling environments, calibration actuators and other sensitive equipment are mechanically sealed for access by a wire. The regulatory representatives use a piece of lead or other soft metal material that the wire is passed through and then pressed to block removal of the wire. This mechanical seal has a code, signet, or logo to evidence its authenticity. To calibrate a meter, the seal is removed and the calibration actuator is set in calibration mode. The meter is then adjusted and the owner of the equipment is required to inform the authorities so that they can visit the station to verify the calibration and re-seal the meter. This process can take several days depending on location, which can provide an opportunity for unscrupulous parties to adjust the meter to measure incorrectly and then re-adjust just before the authorities arrive to verify the calibration. Also, if the tool used to create the mechanical seal is lost or stolen, it can be used to hide fraudulent adjustments by unauthorized parties.

In some embodiments of the systems and methods disclosed herein, it is not possible to use the fuel dispenser after a calibration is performed until the calibration is verified by an authorized party.

In some embodiments of the systems and methods disclosed herein, it is possible to control access to the calibration function and provide account termination or other discipline when inappropriate or fraudulent use is detected. In addition, the party that controls the security server 106 can block competitors from performing calibrations or other service, or require a fee in order to obtain access.

These and other technical effects can be obtained in one or more of the embodiments described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A security system, comprising:
   at least one database storing, for each of a plurality of users, a unique user identification that identifies the user, authentication information associated with the user, and one or more access privileges defined for the user; and
   a server including a network interface configured to communicate with a user device over a network, the server being configured to:
   receive at the network interface from the user device encrypted data and a unique identifier of a secure device for which a user of the user device seeks access;
   query the at least one database to determine whether the user of the user device is an authorized user of the server;
   in response to determining that the user of the user device is an authorized user of the server, query the at least one database to obtain a secret key associated with the unique identifier received from the user device;
   decrypt the encrypted data using the obtained secret key;
   extract a function code and a session password from the decrypted data;
   query the at least one database to determine whether the user of the user device is authorized to access a function represented by the function code; and
   in response to determining that the user is authorized to access the function represented by the function code, transmit the session password to the user device via the network interface.

2. The system of claim 1, wherein the server is configured to receive at the network interface from the user device authentication data associated with the user of the user device, and determining whether the user of the user device is an authorized user of the server includes comparing the received authentication data with the authentication information stored in the at least one database.

3. The system of claim 1, wherein the server is configured to receive at the network interface from the user device access privilege data associated with the user of the user device, and determining whether the user of the user device is authorized to access a function represented by the function code includes comparing the received access privilege data with the one or more access privileges stored in the at least one database.

4. The system of claim 1, wherein the encrypted data is generated by the secure device and is transmitted from the secure device to the user device.

5. The system of claim 1, wherein the function includes installing software on the secure device, authenticating the secure device, and accessing a log of activity of the secure device.

6. The system of claim 1, wherein the secure device includes a fuel dispenser.

7. The system of claim 6, wherein the function includes at least one of verifying a calibration procedure of the fuel dispenser, installing software on the fuel dispenser, authenticating the fuel dispenser, and accessing a log of activity of the fuel dispenser.

8. A fuel dispenser security system, comprising:
a server configured to authorize a user device to electronically access a secured function of a select one of a plurality of fuel dispensers in response to the server receiving from the user device an identifier uniquely identifying the select one of the fuel dispensers,
authenticating a user of the user device as being among one or more users predetermined to have authorized access to the server, and
determining that the user of the user device has been pre-authorized to access the secured function;
wherein each of the plurality of fuel dispensers has associated therewith a predetermined identifier that uniquely identifies the fuel dispenser.

9. The system of claim 8, wherein the secured function includes at least one of verifying a calibration procedure of the fuel dispenser, installing software on the fuel dispenser, authenticating the fuel dispenser, and accessing a log of activity of the fuel dispenser.

10. The system of claim 8, wherein the server is configured to receive authentication information from the user device, and authenticating the user of the user device includes
comparing the received authentication information with user access data stored in at least one database indicating authorized server access for each of a plurality of users, and
determining that the received authentication information corresponds to the user access data for one of the plurality of users.

11. The system of claim 8, wherein the server is configured to receive an encrypted challenge from the user device, and determining that the user of the user device has been pre-authorized to access the secured function includes
retrieving from at least one database a secret key associated with the select one of the fuel dispensers, the at least one database storing the secret key therein as being uniquely associated with the identifier, and
decrypting the encrypted challenge using the retrieved secret key.

12. The system of claim 8, wherein receiving from the user device the identifier includes a network interface of the server receiving the identifier from the user device over a network.

13. The system of claim 8, wherein the server being configured to authorize the user device to electronically access the secured function includes the server being configured to transmit a password to the user device after the receiving, the authenticating, and the determining.

14. The system of claim 8, wherein the server is configured to deny the user device electronic access to the secured function of the select one of the plurality of fuel dispensers in response to any one or more of the server not receiving from the user device the identifier uniquely identifying the select one of the fuel dispensers, not authenticating the user of the user device as being among one or more users predetermined to have authorized access to the server, and not determining that the user of the user device has been pre-authorized to access the secured function.

15. The system of claim 8, further comprising the plurality of fuel dispensers, each of the fuel dispensers storing in a memory thereof the predetermined identifier uniquely identifying the fuel dispenser.

16. A fuel dispenser security method, comprising:
receiving over a network a request from a user device to access a function of a fuel dispenser;
generating data that includes a session password and a function code corresponding to the requested function;
encrypting the generated data using a secret key stored at the fuel dispenser;
transmitting the encrypted data to the user device;
prompting the user device for the session password;
receive from the user device a password in response to the prompting; and
allowing the user device to electronically access the requested function in response to the received password matching the session password, and denying the user device electronic access to the requested function in response to the received password not matching the session password.

17. The method of claim 16, wherein the function includes at least one of verifying a calibration procedure of the fuel dispenser, installing software on the fuel dispenser, authenticating the fuel dispenser, and accessing a log of activity of the fuel dispenser.

18. The method of claim 16, further comprising transmitting to the user device a unique identifier that identifies the fuel dispenser.

19. The method of claim 18, wherein the unique identifier is publically available, and the secret key is not publically available.

20. The method of claim 16, wherein allowing the user device to electronically access the requested function in response to the received password matching the session password only allows the user device to electronically access the requested function and not any other functions of the fuel dispenser.

* * * * *